(12) United States Patent
Watanabe

(10) Patent No.: US 7,730,158 B2
(45) Date of Patent: Jun. 1, 2010

(54) INFORMATION PROCESSING APPARATUS, IN-VEHICLE APPARATUS, INFORMATION SYSTEM, AND INFORMATION PROCESSING APPARATUS CONTROL PROGRAM

(75) Inventor: Hisayuki Watanabe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 603 days.

(21) Appl. No.: 11/560,652

(22) Filed: Nov. 16, 2006

(65) Prior Publication Data
US 2007/0167227 A1 Jul. 19, 2007

(30) Foreign Application Priority Data
Nov. 24, 2005 (JP) ............................. 2005-338269

(51) Int. Cl.
G06F 15/16 (2006.01)
(52) U.S. Cl. .................. 709/217; 709/218; 709/216
(58) Field of Classification Search ................ 709/221, 709/216, 217, 226, 214
See application file for complete search history.

(56) References Cited

U.S. PATENT DOCUMENTS

| | | | |
|---|---|---|---|
| 6,202,008 B1 | 3/2001 | Beckert et al. | |
| 6,363,412 B1* | 3/2002 | Niwa et al. | 709/203 |
| 6,526,335 B1* | 2/2003 | Treyz et al. | 701/1 |
| 6,711,474 B1* | 3/2004 | Treyz et al. | 701/1 |
| 7,188,185 B2* | 3/2007 | Dowling | 709/230 |
| 7,302,465 B2* | 11/2007 | Ayres et al. | 709/203 |
| 7,424,535 B2* | 9/2008 | Karaoguz et al. | 709/226 |
| 7,496,665 B2* | 2/2009 | Karaoguz et al. | 709/226 |
| 7,502,820 B2* | 3/2009 | Manders et al. | 709/203 |
| 2004/0139180 A1* | 7/2004 | White et al. | 709/221 |
| 2007/0100507 A1* | 5/2007 | Simon | 701/1 |

FOREIGN PATENT DOCUMENTS

JP 2001-313741 11/2001

OTHER PUBLICATIONS

David Hoadley, Jeff Siegel and Darren Scarfe, "In Vehicle data Acquisition, transfer and real time processing", Electronic Engineering; Nov. 1998, vol. 70 Issue 862 p. 37.*

* cited by examiner

Primary Examiner—Nathan Flynn
Assistant Examiner—Aftab Nasir Khan
(74) Attorney, Agent, or Firm—Brinks Hofer Gilson & Lione

(57) ABSTRACT

In an information system including an information processing apparatus and an in-vehicle apparatus, a synchronization process is performed in a highly efficient manner, which allows an improvement in usability in playing back playable data on the in-vehicle apparatus. The information processing apparatus acquires a list of playable data already existing in the in-vehicle apparatus and produces synchronization data by extracting, as the synchronization data, playable data from the playable data existing in the information processing apparatus in accordance with the acquired list such that the extracted playable data does not include any part of the playable data already existing in the in-vehicle apparatus.

8 Claims, 6 Drawing Sheets

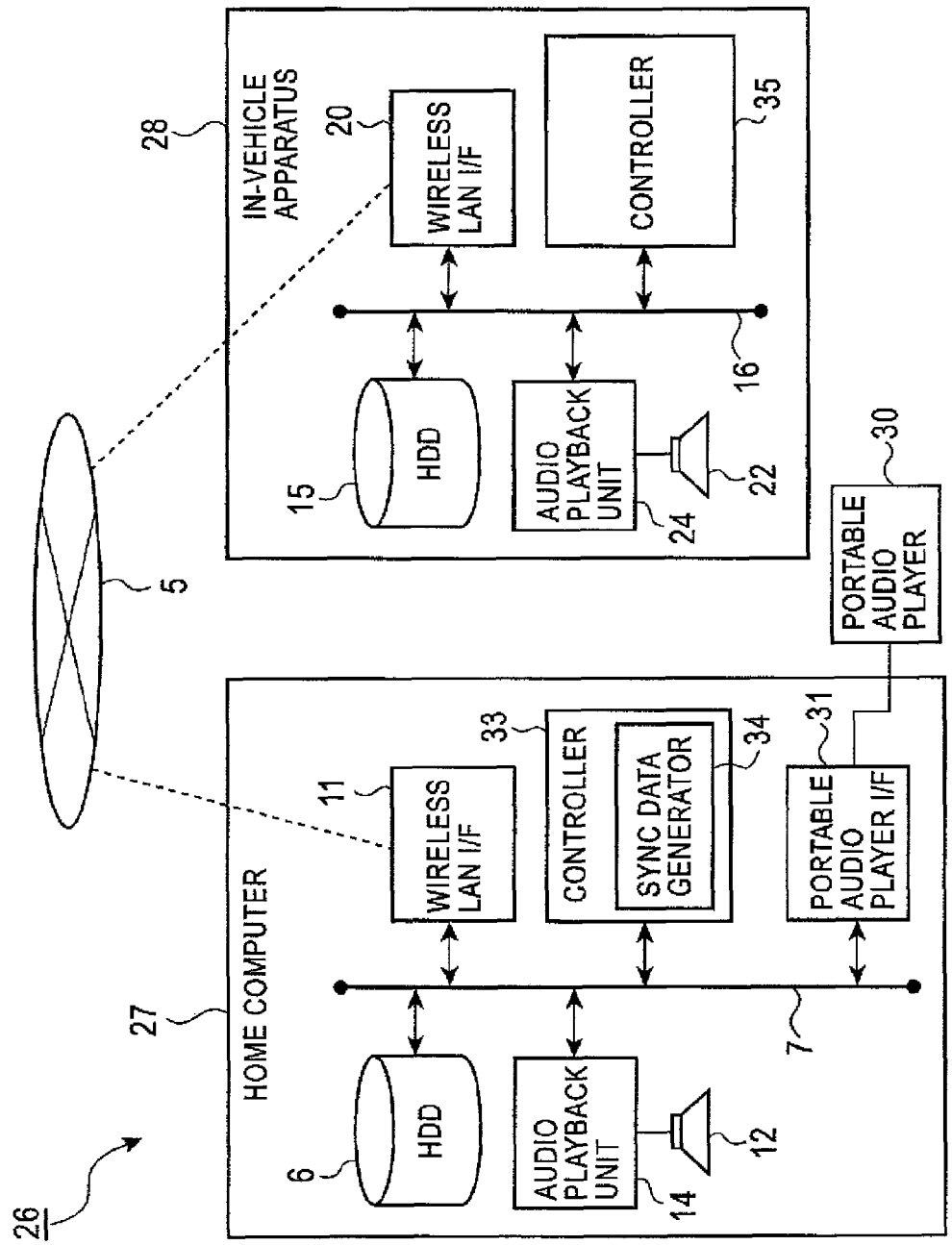

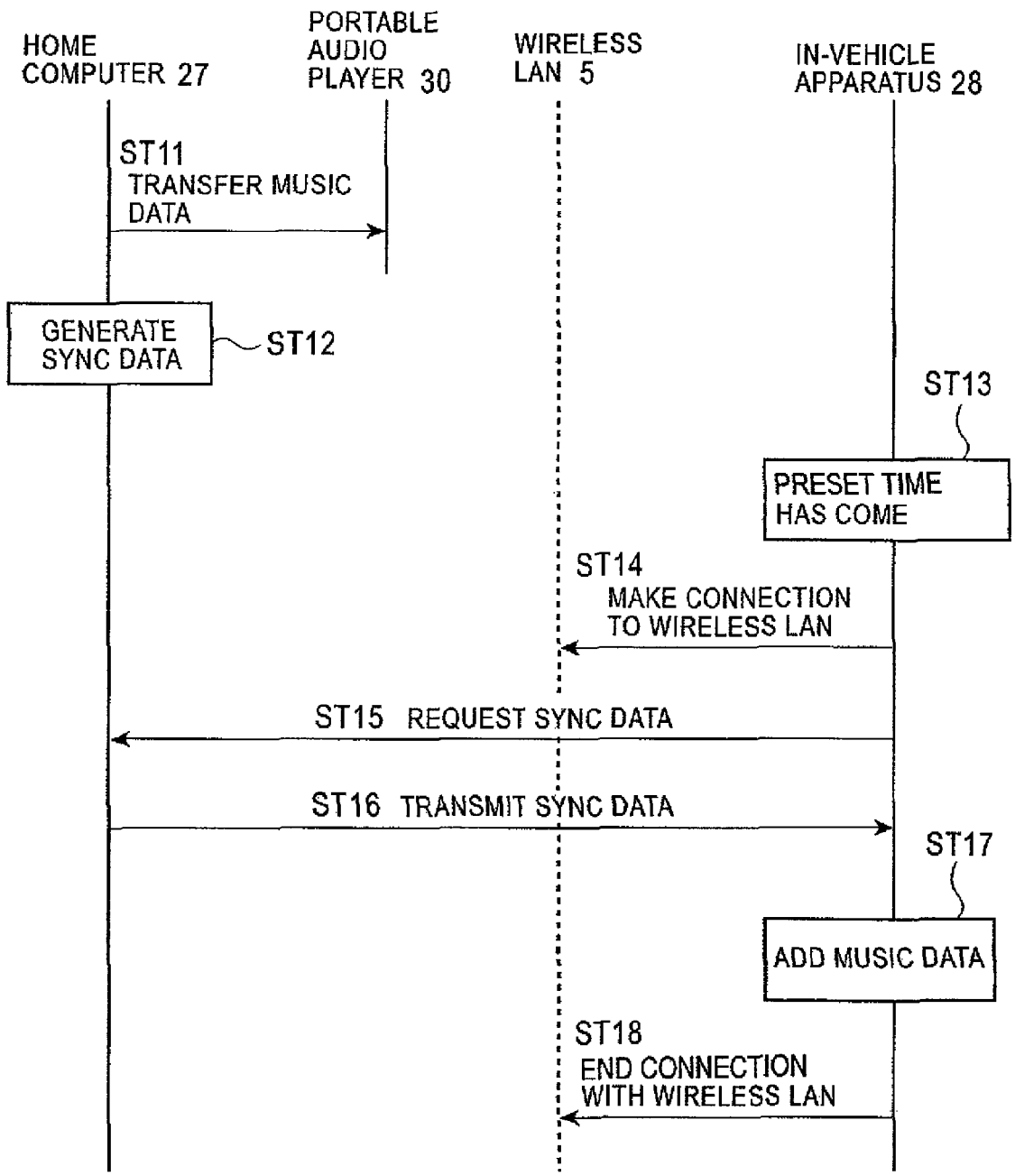

INFORMATION PROCESSING APPARATUS, IN-VEHICLE APPARATUS, INFORMATION SYSTEM, AND INFORMATION PROCESSING APPARATUS CONTROL PROGRAM

BACKGROUND OF THE INVENTION

1. Related Applications

The present application claims priority to Japanese Patent Application No. 2005-338269, filed Nov. 24, 2005, the entirety of which is hereby incorporated by reference.

2. Field of the Invention

The present invention relates to an information processing apparatus, an in-vehicle apparatus, an information system, and an information processing apparatus control program, and more particularly, to an information processing apparatus, an in-vehicle apparatus, an information system, and an information processing apparatus control program which synchronize playable data between the information processing apparatus and the in-vehicle apparatus.

3. Description of the Related Art

A system has been proposed in which a home computer and an in-vehicle apparatus of a user are operated in a cooperative manner such that music data is transferred from the home computer to the in-vehicle apparatus to achieve synchronization in terms of music data between the music data stored in the in-vehicle apparatus and the music data stored in the home computer (see, for example, Japanese Unexamined Patent Application Publication No. 2001-313741).

In such a system, it is assumed that the home computer and the in-vehicle apparatus are connected to each other via communication means such as a wireless LAN, and music data is automatically transferred (downloaded) from the home computer to the in-vehicle apparatus at specified times.

Examples of music data playable by the in-vehicle apparatus include music data stored on a CD/DVD mounted in a CD/DVD changer disposed in the in-vehicle apparatus, music data stored on a hard disk drive (HDD) disposed in the in-vehicle apparatus, and music data stored in a portable audio player such as an iPod (trademark) connectable to the in-vehicle apparatus In some cases, an overlap can occur between the music data existing in the home computer and the music data already existing in the in-vehicle apparatus. If music data is simply transferred without taking into account the possibility of duplication of music data, there is a possibility that music data the same as music data already existing in the in-vehicle apparatus is transmitted from the home computer to the in-vehicle apparatus. This causes inefficiency in transferring the music data. Furthermore, there is a possibility that the same music data is stored in a duplicated manner in the in-vehicle apparatus, which causes a user to have confusion when the user plays back music data on the in-vehicle apparatus. This is very inconvenient for the user.

BRIEF SUMMARY

In view of the above, it is an object of the present invention to provide an information processing apparatus, an in-vehicle apparatus, an information system, and an information processing apparatus control program which perform a synchronization process in a highly efficient manner thereby allowing an improvement in usability in playing back playable data on the in-vehicle apparatus.

To achieve the above object, the present invention provides an information processing apparatus capable of producing synchronization data by acquiring a list of playable data existing in the in-vehicle apparatus from the in-vehicle apparatus, and extracting playable data from the playable data existing in the information processing apparatus according to the acquired list such that the extracted playable data does not include any part of the playable data already existing in the in-vehicle apparatus. That is, the information processing apparatus according to the present invention is capable of producing synchronization data having no overlap with the playable data already existing in the in-vehicle apparatus.

In the information processing apparatus according to the present invention, the list may be acquired from the in-vehicle apparatus via wireless or wired communication. This configuration of the information processing apparatus allows it to easily acquire the list of playable data existing in the in-vehicle apparatus.

The present invention also provides an information processing apparatus capable of producing synchronization data such that when playable data selected by a user from the playable data existing in the information processing apparatus is supplied to a device capable of supplying this playable data to an in-vehicle apparatus, the synchronization data is produced by extracting playable data as the synchronization data from the playable data existing in the information processing apparatus such that the extracted playable data does not include any part of the playable data supplied to the device. This configuration of the information processing apparatus makes it possible to produce synchronization data having no overlap with the playable data already supplied to the device.

In the information processing apparatus according to the present invention, the device may be a portable audio player. In this case, the information processing apparatus is capable of producing synchronization data having no overlap with the playable data already supplied to the portable audio player.

In the information processing apparatus according to the present invention, the playable data may be music data. In this case, the information processing apparatus is capable of producing synchronization data having no overlap with the music data already existing in the in-vehicle apparatus or already supplied to the device.

In the information processing apparatus according to the present invention, the synchronization process may be performed via wireless or wired communication. This configuration of the information processing apparatus makes it possible to easily perform the synchronization process.

The present invention provides an in-vehicle apparatus configured to be capable of providing a list of playable data existing in the in-vehicle apparatus to an information processing apparatus when the information processing apparatus produces synchronization data to be used in the synchronization process. The in-vehicle apparatus configured in this manner allows the information processing apparatus to produce synchronization data in accordance with the list of playable data existing in the in-vehicle apparatus such that the produced synchronization data does not overlap in content with the playable data existing in the in-vehicle apparatus.

The in-vehicle apparatus may be configured to be capable of providing the list to the information processing apparatus via wireless or wired communication. This configuration of the in-vehicle apparatus makes it possible to easily provide the list of playable data existing in the in-vehicle apparatus to the information processing apparatus.

In the in-vehicle apparatus according to the present invention, the playable data may be music data. In this case, the in-vehicle apparatus allows the information processing apparatus to produce synchronization data in accordance with the list of music data existing in the in-vehicle apparatus such that the produced synchronization data does not overlap in content with the music data existing in the in-vehicle apparatus.

In the present invention, the in-vehicle apparatus may be configured to perform the synchronization process via wireless or wired communication. This configuration of the in-vehicle apparatus makes it possible to easily perform the synchronization process.

The present invention provides an information system in which an in-vehicle apparatus provides a list of playable data existing in the in-vehicle apparatus to an information processing apparatus, and the information processing apparatus produces synchronization data by extracting playable data as the synchronization data from the playable data existing in the information processing apparatus according to the acquired list such that the extracted playable data does not include any part of the playable data already existing in the in-vehicle apparatus. The information system configured in this manner allows the information processing apparatus to produce synchronization data having no overlap in content with the playable data already existing in the in-vehicle apparatus.

In the information system according to the present invention, the list may be provided from the in-vehicle apparatus to the information processing apparatus via wireless or wired communication. In the information system configured in such a manner, it is easy to provide the list of playable data such as music data existing in the in-vehicle apparatus from the in-vehicle apparatus to the information processing apparatus.

The present invention provides an information system in which when playable data selected by a user from the playable data existing in an information processing apparatus is supplied from the information processing apparatus to a device capable of supplying this playable data to an in-vehicle apparatus, the information processing apparatus produces synchronization data by extracting playable data as the synchronization data from the playable data existing in the information processing apparatus such that the extracted playable data does not include any part of the playable data already supplied to the device. In this information system, the information processing apparatus is capable of producing synchronization data having no overlap in content with the playable data already supplied to the device.

In the information system according to the present invention, the device may be a portable audio player. In the information system in this case, the information processing apparatus is capable of producing synchronization data having no overlap in content with the playable data already supplied to the portable audio player.

In the information system according to the present invention, the playable data may be music data. In the information system in this case, the information processing apparatus is capable of producing synchronization data having no overlap in content with the music data already existing in the in-vehicle apparatus or already supplied to the device.

In the information system according to the present invention, the synchronization process may be performed via wireless or wired communication. This makes it possible to quickly perform the synchronization process.

The present invention provides an information processing apparatus control program executable by an information processing apparatus to perform a synchronization data producing process including acquiring a list of playable data existing in the in-vehicle apparatus from the in-vehicle apparatus, and producing the synchronization data by extracting playable data as the synchronization data from the playable data existing in the information processing apparatus according to the acquired list such that the extracted playable data does not include any part of the playable data already existing in the in-vehicle apparatus. That is, this information processing apparatus control program allows the information processing apparatus to produce the synchronization data so as not to have an overlap in content with the playable data existing in the in-vehicle apparatus.

The information processing apparatus, the in-vehicle apparatus, the information system, and the information processing apparatus control program according to the present invention provide the advantage that it is possible to produce the synchronization data so as not to have an overlap in content with the playable data already existing in the in-vehicle apparatus, and thus it is possible to perform the synchronization process in a highly efficient manner. This allows an improvement in usability in playing back data by the in-vehicle apparatus, and the application software of the in-vehicle apparatus has additional high value.

In the present invention, providing the list of playable data existing in the in-vehicle apparatus, for use in the synchronization process, from the in-vehicle apparatus to the information processing apparatus and/or the synchronization process is performed via wireless or wired communication. This allows it to easily produce the synchronization data and/or perform the synchronization process.

Furthermore, the present invention performs the synchronization process to synchronize music data in a highly efficient manner. Thus, an improvement in usability in playing back music data by the in-vehicle apparatus can be achieved.

BRIEF DESCRIPTION OF THE DRAWINGS

FIG. 5 is a block diagram showing an information system according to the second embodiment of the present invention; and FIG. 6 shows a sequence of processes performed in an information system according to the second embodiment of the present invention,

DETAILED DESCRIPTION OF THE PREFERRED EMBODIMENTS

First Embodiment

An information system according to a first embodiment of the present invention is described below with reference to FIGS. 1 to 3.

Figure 1:
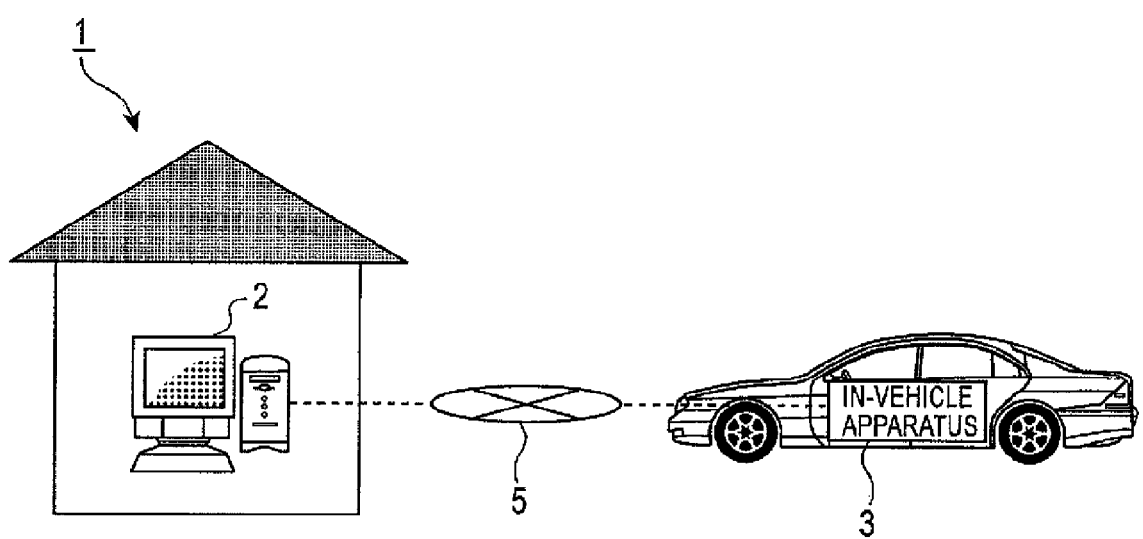
FIG. 1 is a diagram generally showing an information system according to an embodiment of the present invention.

In the present embodiment, as shown in FIG. 1, the information system 1 includes an in-vehicle apparatus 3 and a home computer 2 serving as an information processing apparatus. The home computer 2 and the in-vehicle apparatus 3 are capable of communicating with each other via a wireless LAN 5 serving as a wireless communication means connected to the home computer 2.

Figure 2:
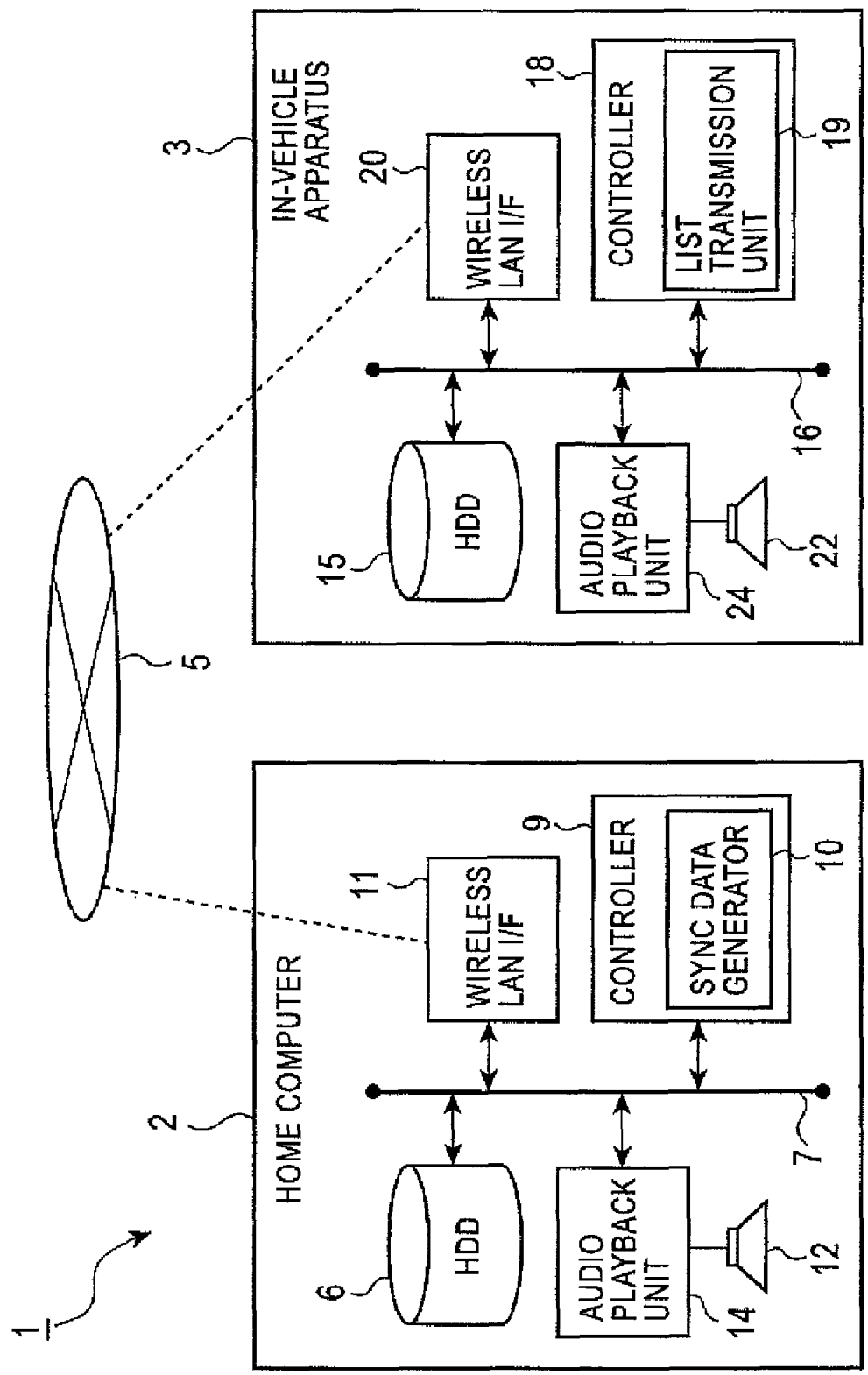
FIG. 2 is a block diagram showing an information system according to an embodiment of the present invention.

As shown in FIG. 2, the home computer 2 includes a hard disk drive (HDD) 6, in which music data is stored in the form of a file. The hard disk drive 6 of the home computer 2 is connected to a controller 9 in the home computer 2 via a system bus 7.

A home computer control program is installed in the controller 9 of the home computer 2. This home computer control program describes the operation executed by the home computer 2 to perform a synchronization process to synchronize music data which exists in and is playable by the in-vehicle apparatus 3 with music data existing in the home computer 2.

The controller 9 in the home computer 2 controls the operation of the home computer 2 by executing the home computer control program. The controller 9 in the home computer 2 includes a synchronization data generator 10 configured to produce synchronization data for use in the synchronization process under the control of the controller 9 of the home computer 2 (according to the home computer control program).

A wireless LAN interface (I/F) 11 (in the home computer 2) through which the home computer 2 is connected to a wireless LAN 5 and an audio playback unit 14 (in the home computer 2) configured to play back audio data such as music data (stored in the home computer 2) in the form of sound/voice from a speaker 12 are connected to the system bus 7.

On the other hand, as shown in FIG. 2, the in-vehicle apparatus 3 includes a hard disk drive (HDD) 15 in which music data (hereinafter, referred to as music data stored in the in-vehicle apparatus 3 when necessary to distinguish from music data stored in the home computer 2) is stored in the form of a file. In the in-vehicle apparatus 3, the music data may be stored on a CD or a DVD mounted in a CD/DVD changer or the like disposed in the in-vehicle apparatus 3 or may be stored in a portable audio player (such as an iPod (trademark)) connected to the in-vehicle apparatus 3. I The hard disk drive 15 in the in-vehicle apparatus 3 is connected to a controller 18 in the in-vehicle apparatus 3 via a system bus 16. An in-vehicle apparatus control program to control the operation of the in-vehicle apparatus 3 associated with the synchronization process is stored in the controller 18 in the in-vehicle apparatus 3. The controller 18 in the in-vehicle apparatus 3 controls the operation of the in-vehicle apparatus 3 by executing the in-vehicle apparatus control program.

Note that the in-vehicle apparatus control program and the home computer control program are included in an information system control program which controls the information system 1.

The controller 18 in the in-vehicle apparatus 3 includes a list transmission unit 19 configured to transmit a list such that when synchronization data is produced by the synchronization data generator 10, the list transmission unit 19 transmits the list of music data stored in the in-vehicle apparatus 3 to the home computer 2 under the control of the controller 18 in the in-vehicle apparatus 3.

The list of music data may be a list of music data stored in the hard disk drive 15 in the in-vehicle apparatus 3 or a list of music data stored on a CD or a DVD mounted in the CD/DVD changer. The list of music data may be a list of music data stored in a portable audio player which is currently connected to the in-vehicle apparatus 3 or which has been connected in the past to the in-vehicle apparatus 3. The list of music data stored in a portable audio player which has been connected in the past to the in-vehicle apparatus 3 may be stored in the hard disk drive 15 in the in-vehicle apparatus 3 when the portable audio player is connected to the in-vehicle apparatus 3.

The system bus 16 is also connected to a wireless LAN interface (I/F) 20 (in the in-vehicle apparatus 3) through which the in-vehicle apparatus 3 is connected to the wireless LAN 5 and an audio playback unit 24 (in the in-vehicle apparatus 3) configured to play back audio data such as music data stored in the in-vehicle apparatus 3 in the form of sound/voice from a speaker 22.

In the present embodiment, under the control of the controller 9 of the home computer 2, the synchronization data generator 10 acquires the list of music data stored in the in-vehicle apparatus 3 transmitted from the list transmission unit 19 of the in-vehicle apparatus 3 via the wireless LAN 5 and the wireless LAN interface 11 in the home computer 2.

In accordance with the acquired list of music data stored in the in-vehicle apparatus 3, the synchronization data generator 10 produces the synchronization data by extracting, as the synchronization data, music data from the music data stored in the hard disk drive 6 of the home computer 2 such that the extracted music data does not include any part of the music data already existing in the in-vehicle apparatus 3. Under the control of the controller 9 of the home computer 2, the home computer 2 transmits the synchronization data produced by the synchronization data generator 10 to the in-vehicle apparatus 3. The synchronization data transmitted from the home computer 2 are acquired by the controller 18 in the in-vehicle apparatus 3 via the wireless LAN 5 and the wireless LAN interface 20 in the in-vehicle apparatus 3.

Under the control of the controller 18 in the in-vehicle apparatus 3, the synchronization data (music data extracted from the music data stored in the home computer 2 so as to have no overlap with the music data stored in the in-vehicle apparatus 3) acquired from the home computer 2 is added to the hard disk drive 15 in the in-vehicle apparatus 3. As a result, the music data stored in the in-vehicle apparatus 3 becomes the same as the music data stored in the home computer 2 (that is, synchronization is achieved).

In the present embodiment, as described above, synchronization data is produced so as not to overlap with the music data stored in the in-vehicle apparatus 3. Thus, no unneeded music data is transmitted to the in-vehicle apparatus 3, and the synchronization process can be performed in a highly efficient manner. In the synchronization process, no music data is added in a duplicated manner to the music data already existing in the in-vehicle apparatus 3. Thus, a user does not have confusion, which might occur if music data is added in a duplicated manner, and an improvement in usability in playing back music data on the in-vehicle apparatus 3 is achieved.

The operation of the information system 1 according to the present embodiment is described with reference to a flow chart shown in FIG. 3.

Figure 3:
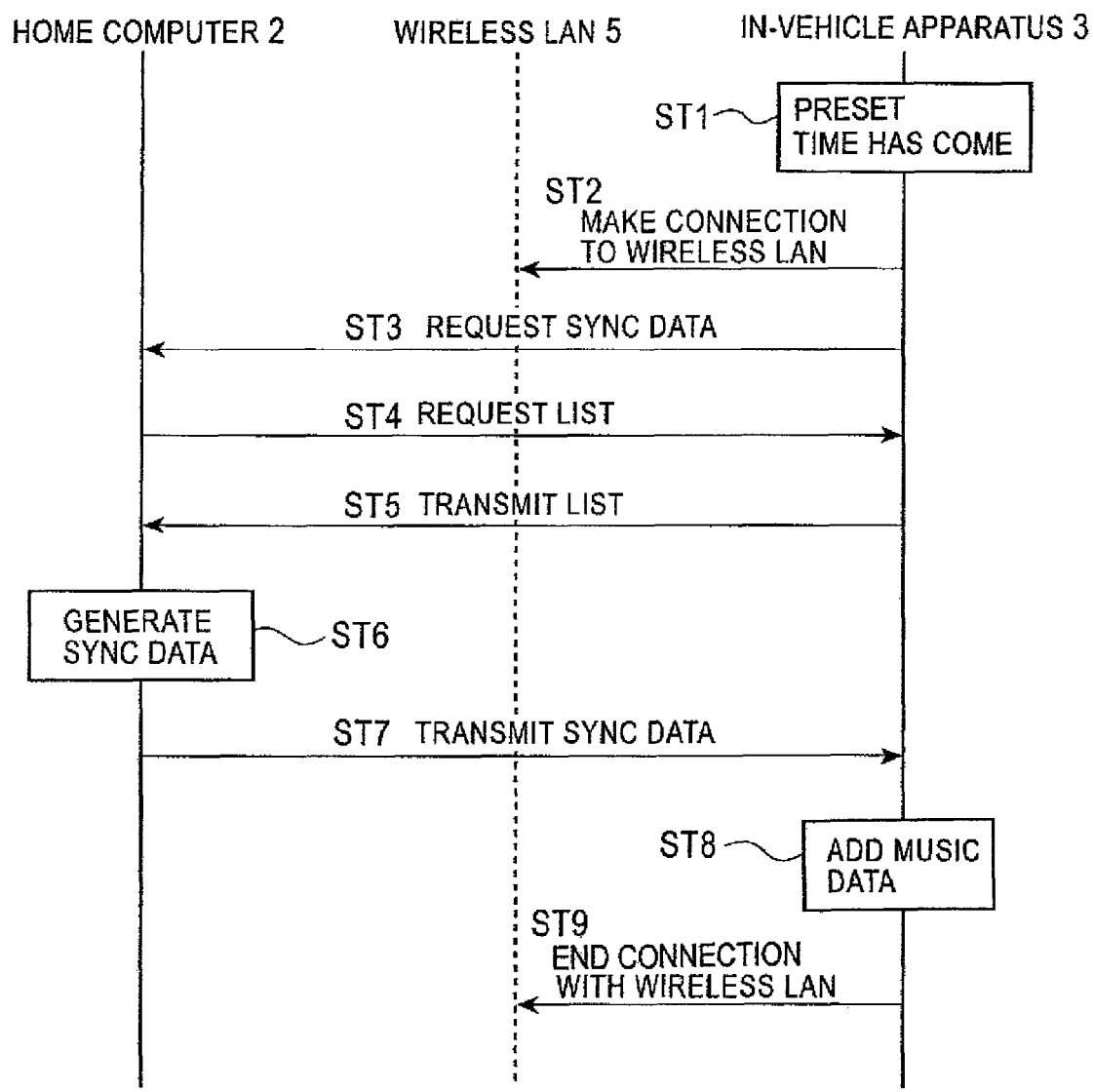
FIG. 3 shows a sequence of processes performed in an information system according to an embodiment of the present invention.

First, in step 1 (ST1) shown in FIG. 3, at a preset time the in-vehicle apparatus 3 starts the synchronization process including generation of synchronization data. In step 2 (ST2), the controller 18 of the in-vehicle apparatus 3 (by executing the in-vehicle apparatus control program) connects the in-vehicle apparatus 3 to the wireless LAN 5. In step 3 (ST3), under the control of the controller 18 in the in-vehicle apparatus 3, the in-vehicle apparatus 3 requests the home computer 2 to supply the synchronization data.

If the home computer 2 receives the request issued in step 3 (ST3), then in step 4 (ST4) the home computer 2 requests the in-vehicle apparatus 3 to transmit the list of music data stored in the in-vehicle apparatus 3, which is needed to produce the synchronization data, under the control of the controller 9 in the home computer 2 (according to the home computer control program). If the in-vehicle apparatus 3 receives the request issued in step 4 (ST4), then in step 5 (ST5), the in-vehicle apparatus 3 transmits the list of music data stored in the in-vehicle apparatus 3 to the home computer 2 through the list transmission unit 19.

If the home computer 2 receives the list of music data stored in the in-vehicle apparatus 3 transmitted in step 5 (ST5), then in step 6 (ST6) the home computer 2 produces synchronization data by using the synchronization data generator 10 under the control of the controller 9 of the home computer 2. In step 6 (ST6), in accordance with the list of the music data stored in the in-vehicle apparatus 3 acquired in step 5 (ST5), the synchronization data generator 10 produces the synchronization data by extracting music data as the synchronization data from the music data stored in the home computer 2 so as to have no overlap with the music data stored in the in-vehicle apparatus 3.

In step 7 (ST7), under the control of the controller 9 of the home computer 2, the home computer 2 transmits the synchronization data produced in step 6 (ST6) to the in-vehicle apparatus 3. This process is a main part of the synchronization process.

In step 8 (ST8), under the control of the controller 18 of the in-vehicle apparatus 3, the in-vehicle apparatus 3 adds the music data of the synchronization data received in step 7 (ST7) to the hard disk drive 15 of the in-vehicle apparatus 3 thereby achieving synchronization with the home computer 2 in terms of the music data. This process also is a main part of the synchronization process.

Because the synchronization data transmitted in step 7 (ST7) is high-efficiency data which does not include music data already existing in the in-vehicle apparatus 3, music data which already exists in the hard disk drive 15 of the in-vehicle apparatus 3 is not added in a duplicated manner in step 8 (ST8).

In step 9 (ST9), under the control of the controller 18 of the in-vehicle apparatus 3, the in-vehicle apparatus 3 ends the connection with the wireless LAN 5.

Note that it is not necessarily needed to perform the synchronization process (main part thereof) immediately following the generation of the synchronization data used in the synchronization process. For example, communication between the home computer 2 and the in-vehicle apparatus 3 may be turned off when the generation of the synchronization data is completed, and the home computer 2 may be reconnected to the in-vehicle apparatus 3 when a request for the synchronization data is issued by the in-vehicle apparatus 3 and the synchronization data may be transmitted from the home computer 2 to the in-vehicle apparatus 3. Also, step 9 (ST9) may be performed before step 8 (ST8).

Second Embodiment

A second embodiment of the present invention is described below with reference to FIGS. 4 to 6. Parts similar to those in the first embodiment are denoted by similar reference numerals. In the following explanation, a major focus will be on differences from the first embodiment.

Figure 4:
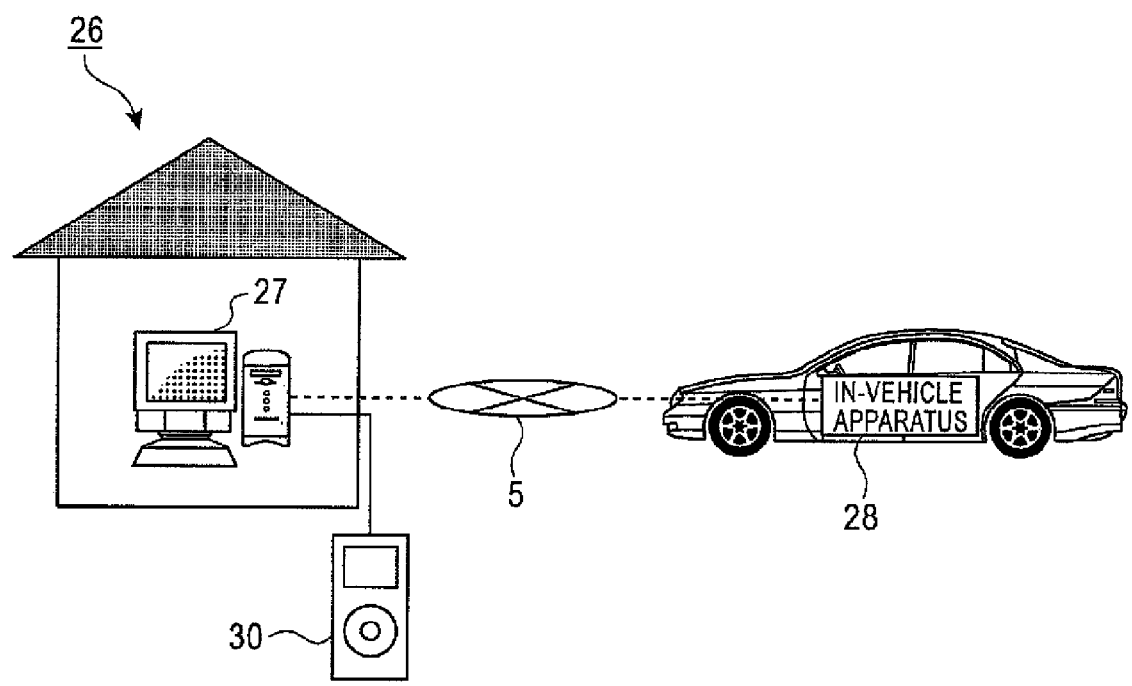
FIG. 4 is a diagram generally showing an information system according to a second embodiment of the present invention.

As shown in FIG. 4, an information system 26 according to the present embodiment is similar to the first embodiment in that the system includes a home computer 27 serving as an information processing apparatus and an in-vehicle apparatus 28, and in that a synchronization process is performed by transmitting synchronization data between the home computer 27 and the in-vehicle apparatus 28.

However, the information system 26 according to the present embodiment is different than the first embodiment in that synchronization data is produced taking into account the content of music data transferred from the home computer 2 to a portable audio player 30 (such as an iPod) or the like.

In the present embodiment, as shown in FIG. 5, an interface (I/F) 31 for interfacing the home computer 27 with the portable audio player 30 is connected to the system bus 7 of the home computer 27, and the portable audio player 30 is connected to the home computer 27 via this interface 31. Music data selected by a user from the music data stored in the hard disk drive 6 of the home computer 27 may be transferred to the portable audio player 30 connected to the home computer 27.

The portable audio player 30 may also be connected to the in-vehicle apparatus 28. In the state in which the portable audio player 30 is connected to the in-vehicle apparatus 28, music data may be supplied from the portable audio player 30 to the in-vehicle apparatus 28 and played back by an audio playback unit 24 in the in-vehicle apparatus 28.

In the present embodiment, under the control of the controller 33 in the home computer 2 (according to the home computer control program), a synchronization data generator 34 produces synchronization data by extracting music data such that the extracted music data does not include any part of the music data already transferred to the portable audio player 30.

In the circumstance in which the portable audio player 30 is capable of supplying music data to the in-vehicle apparatus 28, the music data transferred to the portable audio player 30 can be regarded as music data which exists in the in-vehicle apparatus 28 and which can be played back by the in-vehicle apparatus 28, as with the music data stored in the hard disk drive 15 or the like of the in-vehicle apparatus 28.

That is, in the present embodiment, because the synchronization data is produced so as to have no overlap in content with the music data already transferred to the portable audio player 30, the synchronization process can be performed in a highly efficient manner, as in the first embodiment in which a high-efficiency synchronization process is achieved by producing synchronization data so as to have no overlap in content with the music data already existing in the in-vehicle apparatus. Thus, a user does not have confusion, and an improvement is achieved in usability in playing back music data on the in-vehicle apparatus 28.

Note that in the present embodiment, the synchronization data is produced in a different manner than the manner in which the synchronization data is produced in the first embodiment. The controller 35 of the in-vehicle apparatus 28 according to the present embodiment does not have a list transmission unit such as the list transmission unit 19 according to the first embodiment.

The operation of the information system 26 according to the present embodiment is described with reference to FIG. 6.

First, in step 11 (ST11) shown in FIG. 6, the home computer 27 transfers music data selected, by a user, from the music data stored in the home computer 27 to the portable audio player 30. In step 12 (ST12), the synchronization data generator 34 produces synchronization data under the control of the controller 33 of the home computer 27 (according to the home computer control program). More specifically, the synchronization data generator 34 produces the synchronization data by extracting music data as the synchronization data from the music data stored in the home computer 27 such that the extracted music data does not include any part of the music data which has already been transferred to the portable audio player 30.

In step 13 (ST13), when a preset time has come, the in-vehicle apparatus 28 starts the main part of the synchronization process. In step 14 (ST14), under the control of the controller 35 of the in-vehicle apparatus 28 (according to the in-vehicle apparatus control program), the in-vehicle apparatus 28 makes a connection to the wireless LAN 5. In step 15 (ST15), under the control of the controller 35 of the in-vehicle apparatus 28, the in-vehicle apparatus 28 requests the home computer 27 to provide synchronization data.

In step 16 (ST16), in accordance with the request received in step 15 (ST15), the home computer 27 transmits the synchronization data produced in step 12 (ST12) under the control of the controller 33 of the home computer 27. In step 17 (ST17), under the control of the controller 35 of the in-vehicle apparatus 28, the in-vehicle apparatus 28 synchronizes the data with that stored in the home computer 27 by adding the synchronization data received in step 16 (ST16) as music data to the hard disk drive 15 of the in-vehicle apparatus 28.

Because the music data transmitted as the synchronization data in step 16 (ST16) does not include any part of the music data already existing in the in-vehicle apparatus 28, the process in step 16 (ST16) is performed in a highly efficient manner with music data having no useless part. Thus, in step 17 (ST17), no music data is added in a duplicated manner to the music data stored in the hard disk drive 15 of the in-vehicle apparatus 28.

Subsequently, in step 18, the in-vehicle apparatus 28 ends the connection with the wireless LAN 5 under the control of the controller 35 of the in-vehicle apparatus 28. Note that step 18 (ST18) may be performed before step 17 (ST17).

According to the present invention, as described above, synchronization data is produced by extracting music data as the synchronization data from the music data stored in the home computer such that the extracted music data does not include any part of the music data already existing in the in-vehicle apparatus, and thus the synchronization process can be performed in a highly efficient manner. This allows an improvement in usability in playing back music data on the in-vehicle apparatus 3 or 38. Furthermore, it is easy to produce the synchronization data and perform the synchronization process via the wireless LAN 5.

The present invention has been described above with reference to specific embodiments. However, the present invention is not limited to the details of these embodiments.

For example, instead of the wireless LAN 5, other types of wireless or wired communication modes may be used in the communication between the home computer and the in-vehicle apparatus.

In the embodiments described above, a home computer is used as the information processing apparatus. Alternatively, other types of information processing apparatus such as a personal server managed by an information center may be used.

In the present invention, playable data is not limited to music data, but may also be other types of playable data such as video data.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

The invention claimed is:

1. An information processing apparatus capable of producing synchronization data to be used in a synchronization process by which data existing in an in-vehicle apparatus and playable by the in-vehicle apparatus is to be synchronized in terms of content with playable data existing in the information processing apparatus, and supplying the produced synchronization data to the in-vehicle apparatus, wherein the synchronization data is produced such that when playable data selected by a user from the playable data existing in the information processing apparatus is supplied to a portable device capable of supplying this playable data to the in-vehicle apparatus, the synchronization data is produced by extracting playable data as the synchronization data from the playable data existing in the information processing apparatus such that the extracted playable data does not include any part of the playable data supplied to the portable device.

2. The information processing apparatus according to claim 1, wherein the device is a portable audio player.

3. The information processing apparatus according to claim 1, wherein the playable data is music data.

4. The information processing apparatus according to claim 1, wherein the information processing apparatus performs the synchronization process via wireless or wired communication.

5. An information system including an information processing apparatus and an in-vehicle apparatus, the information system being capable of performing a synchronization process including producing, by the information processing apparatus, synchronization data to be used in the synchronization process by which data existing in the in-vehicle apparatus and playable by the in-vehicle apparatus is to be synchronized in terms of content with playable data existing in the information processing apparatus, and supplying the produced synchronization data to the in-vehicle apparatus, wherein when playable data selected by a user from playable data existing in the information processing apparatus is supplied from the information processing apparatus to a portable device capable of supplying this playable data to the in-vehicle apparatus, the information processing apparatus produces the synchronization data by extracting playable data as the synchronization data from the playable data existing in the information processing apparatus such that the extracted playable data does not include any part of the playable data already supplied to the portable device.

6. The information system according to claim 5, wherein the device is a portable audio player.

7. The information system according to claim 5, wherein the playable data is music data.

8. The information system according to claim 5, wherein the synchronization process is performed via wireless or wired communication.

* * * * *